(Model.)
J. H. CHEEVER.
Galvanic Battery.
No. 243,428. Patented June 28, 1881.
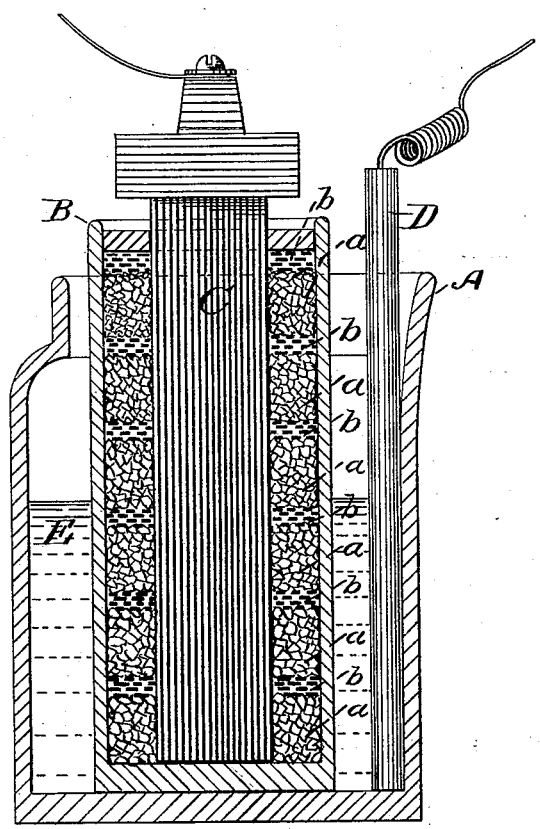
Witnesses.
Geo. Willis Pierce,
T. D. Lockwood
Inventor;
Joseph H. Cheever.

UNITED STATES PATENT OFFICE.

JOSEPH H. CHEEVER, OF SOMERVILLE, MASSACHUSETTS.

GALVANIC BATTERY.

SPECIFICATION forming part of Letters Patent No. 243,428, dated June 28, 1881.

Application filed March 29, 1881. (Model.)

*To all whom it may concern:*

Be it known that I, JOSEPH H. CHEEVER, a citizen of the United States, of Somerville, in the county of Middlesex and State of Massachusetts, have invented certain Improvements in Galvanic Batteries, of which the following is a specification.

My invention relates to that class of galvanic batteries in which depolarization is effected by forming the negative plate of a bar of carbon surrounded by a mixture of crushed carbon and some metallic salt or oxide, which salt or oxide absorbs the hydrogen, which would otherwise remain on the surface of the bar of carbon and greatly diminish the force of the galvanic action.

The objects of my improvement are, first, to provide a battery which quickly recovers its electro-motive force when temporarily exhausted by protracted use; second, to provide an open-circuit cell which will last longer than those now in ordinary use; third, to materially reduce the cost of such a cell.

The invention consists in the use of the nitrates of mercury as a depolarizing material, and also in the combination, with the bar of carbon, of broken coke or carbon and the nitrate of mercury, arranged in alternate layers, and surrounding the said carbon bar in a porous cup, the whole forming the negative plate of a galvanic battery.

The drawing shows a battery-cell in vertical section illustrating my invention.

A is the glass containing-vessel, in which is inserted the porous cup B and the positive plate D, which I prefer to make of rolled zinc. These may be of any ordinary construction, and are herein shown as of the form usually employed in the well-known Leclanché battery.

Within the porous cup B, I place a bar of carbon, C, which has a cap of lead and a binding-screw, to which the leading-out wire is attached.

For a depolarizing agent or material surrounding the carbon bar I may employ either mercurous nitrate, dimercurous nitrate, a mixture of the two, or any of the nitrates of mercury. I prefer to use dimercurous nitrate, and this I arrange in alternate horizontal layers with broken or fragmentary carbon or coke. These substances are in the drawing represented, the carbon by the letter $a$, and the nitrate of mercury by the letter $b$.

The outer vessel, A, after the insertion of the porous cup and zinc, is filled about two-thirds full with the exciting-liquid E. This is preferably the solution of muriate of ammonia (sal-ammoniac) or sulphate of ammonia, but may be any other suitable acid or saline solution.

By the use of my invention a battery is rendered more constant when often put into action, is more durable, and its internal resistance is made very low, while its electro-motive force is normally about the same as that of the Leclanché battery. It is better maintained when the battery is placed on a closed circuit and has much greater recuperative powers.

Although I have described the nitrate of mercury as arranged in layers alternately with broken carbon, I do not confine myself to such an arrangement, but may dispose the said mercurous nitrate in any manner which I may consider advisable.

I do not claim the arrangement of a depolarizing agent in alternate layers with granular matter, such as broken coke or carbon, in a galvanic cell, as such an arrangement is broadly claimed in my former patent, No. 233,601, bearing date of October 26, 1880. Neither do I broadly claim the use of nitrates in a galvanic cell.

I claim—

1. A galvanic battery in which the nitrates of mercury are employed as depolarizing or hydrogen-absorbing agents.

2. In a galvanic cell, a porous cup containing a carbon plate surrounded by alternate layers of nitrate of mercury and broken coke or carbon, substantially as described.

3. In a galvanic cell, the combination of the porous cup B, the carbon plate C, the nitrate of mercury $b$, and the broken carbon $a$, the whole comprising the negative plate, with the containing-vessel A, the exciting-liquid E, and the positive plate D, substantially as specified.

In testimony whereof I have signed my name to this specification in the presence of two subscribing witnesses.

JOSEPH H. CHEEVER.

Witnesses:
GEO. WILLIS PIERCE,
T. DE LISLE LOCKWOOD.